US006628297B1

(12) United States Patent
Wraae et al.

(10) Patent No.: US 6,628,297 B1
(45) Date of Patent: Sep. 30, 2003

(54) APPARATUS, METHODS, AND ARTICLE FOR NON-REDUNDANT GENERATION OF DISPLAY OF GRAPHICAL OBJECTS

(75) Inventors: Anders Wraae, Koebenhavn S (DK); Thomas Villadsen, Koebenhavn N (DK)

(73) Assignee: CrossArtist Software, ApS, Chamblee, GA (US)

( * ) Notice: Subject to any disclaimer, the term of this patent is extended or adjusted under 35 U.S.C. 154(b) by 0 days.

(21) Appl. No.: 09/568,009

(22) Filed: May 10, 2000

(51) Int. Cl.[7] .............................................. G06T 11/60
(52) U.S. Cl. ...................................... 345/628; 345/631
(58) Field of Search ................................ 345/619–622, 345/624, 626, 628, 629, 631; 707/514, 517, 520, 907, 908

(56) References Cited

U.S. PATENT DOCUMENTS

| | | | | |
|---|---|---|---|---|
| 5,522,020 A | | 5/1996 | Narayanaswami | 395/133 |
| 5,544,301 A | * | 8/1996 | Orton et al. | 395/157 |
| 5,669,006 A | | 9/1997 | Joskowicz et al. | 395/779 |
| 5,737,559 A | | 4/1998 | Orton et al. | 395/344 |
| 5,764,228 A | | 6/1998 | Baldwin | 345/344 |
| 6,002,397 A | | 12/1999 | Jaaskelainen, Jr. | 345/340 |
| 6,026,416 A | * | 2/2000 | Kanerva et al. | 707/515 |
| 6,067,098 A | | 5/2000 | Dye | 345/521 |
| 6,091,414 A | | 7/2000 | Kraft, IV et al. | 345/344 |
| 6,097,388 A | | 8/2000 | Goodfellow | 345/344 |
| 6,108,014 A | | 8/2000 | Dye | 345/507 |

* cited by examiner

Primary Examiner—Matthew C. Bella
Assistant Examiner—J. F. Cunningham
(74) Attorney, Agent, or Firm—Alston & Bird LLP

(57) ABSTRACT

A first method is performed by a computing device to generate rect objects for visible portions of objects of a display that have changed from a previous to current update cycle. The first method comprises dividing a visible portion of at least one of a plurality of overlapping objects that has changed from a previous to current update cycle, into at least one rect object. In dividing the changed visible portion, the computing device uses a graphical hierarchy defining precedence for display of the objects. By determining changed areas of the display, the computing device can be programmed to avoid using processing power on portions of the display that have not changed from a previous to current update cycle or that is not visible in the display. In addition, the computing device can determine the portions of the display requiring update relatively rapidly through use of the rect object(s). The method can comprise determining whether the rect object is obstructed by an overlapping object at a higher level of the hierarchy. If rect object is obstructed by the overlapping object, the method can comprise dividing the rect object into at least one additional rect object. This process can be repeated as necessary until visible rect objects have been generated for all changed portions of the display. The invention also includes other related methods, apparatus, and articles.

20 Claims, 11 Drawing Sheets

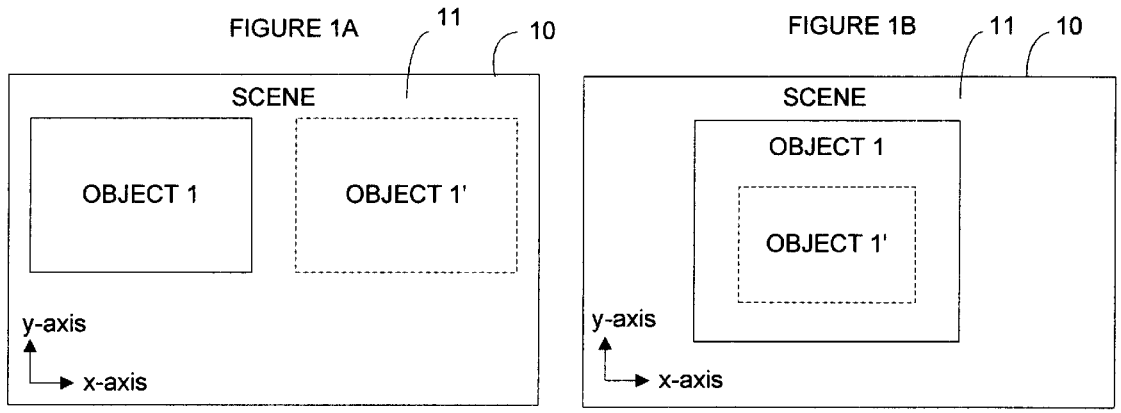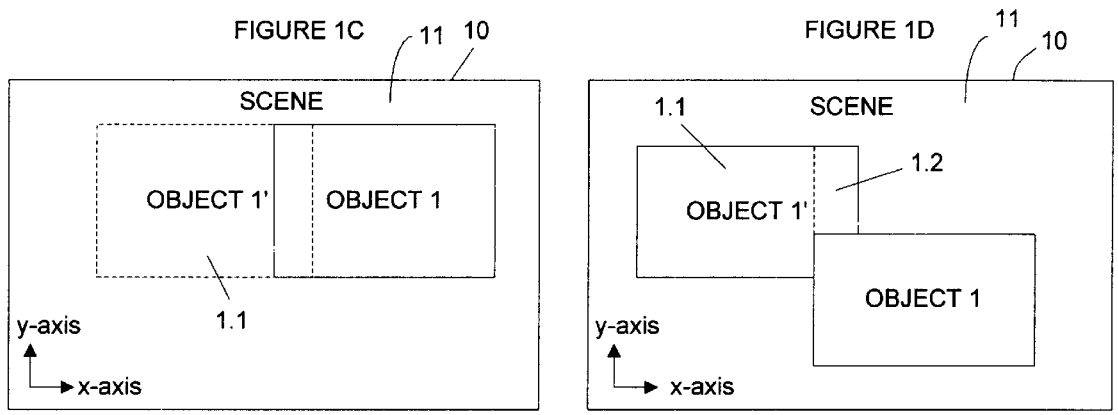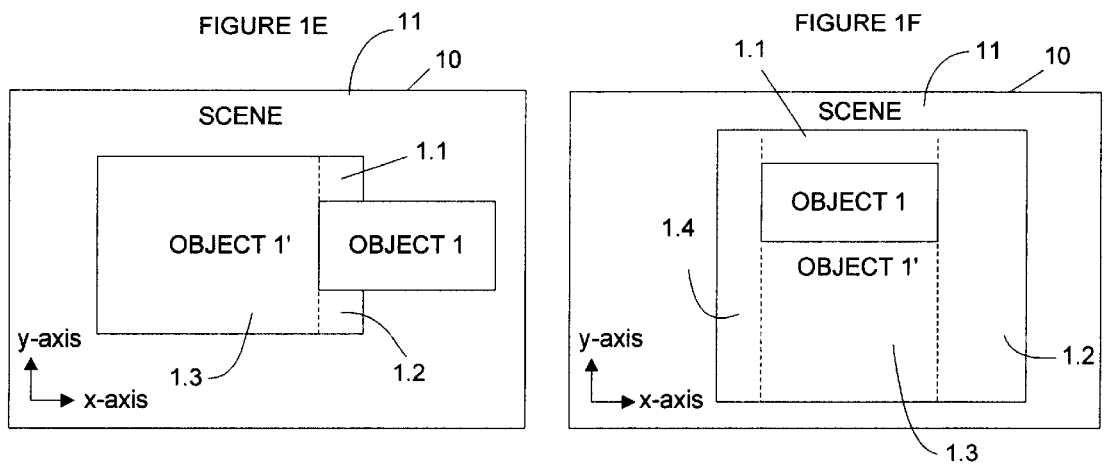

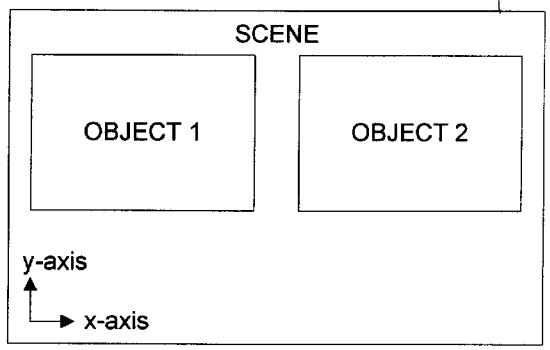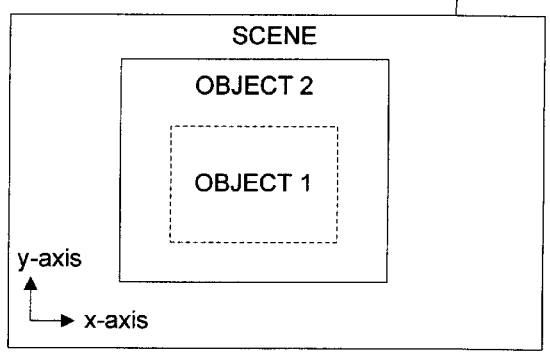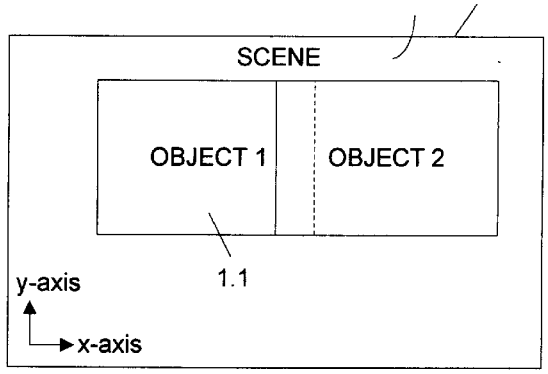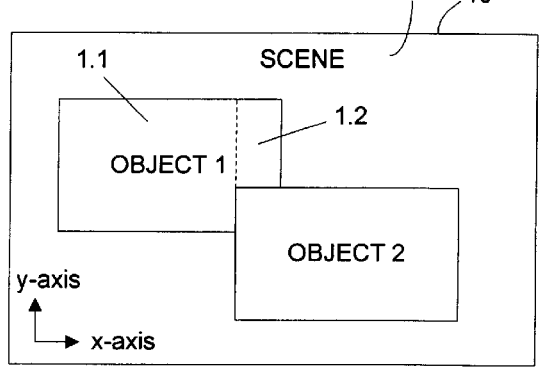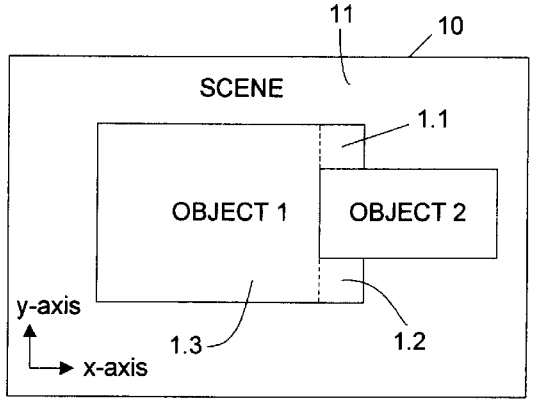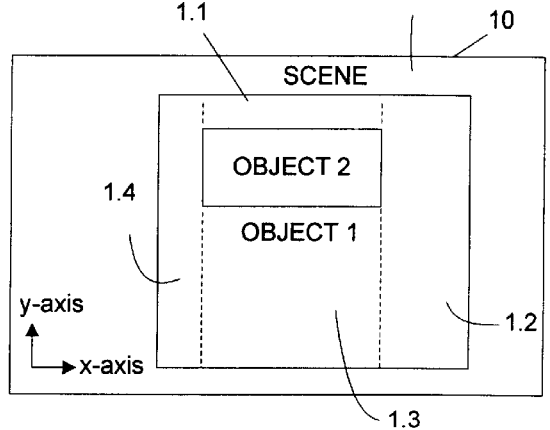

EXEMPLARY HIERARCHY BETWEEN OBJECTS DEFINED BY APPLICATION PROGRAM

APPARATUS, METHODS, AND ARTICLE FOR NON-REDUNDANT GENERATION OF DISPLAY OF GRAPHICAL OBJECTS

FIELD OF THE INVENTION

The invention is directed to an apparatus, methods, and article for generating a display in a non-redundant manner so as to decrease memory space and time required by a computing device to generate the display.

BACKGROUND OF THE INVENTION

There are numerous instances in which overlapping rectangular objects occur in computer-generated displays. For example, in browser displays, it is common to see frames including menus, the tool bars, and controls for the browser, within which is displayed another rectangular object for the hypertext mark-up language (HTML) or extensible mark-up language (XML) document displayed within the browser. Word processing programs typically generate displays with similar frames bounding a software "clip-board" for displaying a rectangular portion of a document page. As another example, many application or server programs generate rectangular menu or dialog boxes including rectangular control objects within a larger rectangular objects. For example a rectangular dialog box may be overlapped by rectangular buttons such as "submit" or "cancel". As yet another example, in some computer game programs and computer graphics programs, a scene object can be overlapped by other rectangular objects. In the Microsoft Windows® or MacIntosh® operating system environments, overlapping windows or other rectangular objects are commonplace.

To generate a display of overlapping objects, an application program is typically pre-programmed with a hierarchy of levels for the display of objects. For example, if a dialog box has a certain position within a display, controls such as software buttons within the dialog box should appear in fixed relation to the dialog box. Thus, if the user drags the dialog box within the display, the buttons within the dialog box will follow the dialog box so that they always have the same relative position with respect to the dialog box that contains them. To display such objects, the computer begins with the object that is lowest in the hierarchy, in this example, the dialog box, and draws objects at successive levels up to the highest object within the hierarchy. In this example, the highest level objects are the two controls. If an object at a particular level of the hierarchy is overlapped by one at a higher level, the computer overwrites the display data for the lower level with that of the higher level for the region in which the two objects overlap. The computer's processor outputs the display data to a monitor or the like to generate the display of such objects on the computer.

Therefore, in previous technologies, generation of displays having overlapping objects involves considerable use of the processing power of the computer's microprocessor to generate data that is not used in the overlapping regions of objects. More specifically, the microprocessor redundantly generates display data for objects in regions overlapped by other objects at higher levels within the hierarchy. It would be desirable to eliminate redundant generation of the display data for such objects to correspondingly reduce the as amount of processing power required to generate such display data. The elimination of redundant display data could lead to significant savings in terms of processing time required of the computing device to generate the display, as well as the memory size required for the display data. To illustrate the magnitude of the problem in more concrete terms, the display size for the video graphics array (VGA) standard common for many monitors and flat-panel displays are six-hundred-forty (640) by four-hundred eighty (480) picture objects ("pixels"). For super VGA (SVGA) the size is one-thousand twenty-four (1,024) by seven-hundred sixty-eight (768) pixels. Because variables such as color and intensity for each pixel can be expressed by as many as twenty-four (24) or more bits, it will be appreciated that the amount of data used to generate an image on a display can be on the order of millions or tens of millions of data bits or more for a single image. If significant amounts of useless data for a display must be generated by a computer, the processing burden may become overwhelming, resulting in degradation of the display. Such degradation can be manifested in terms of slow response by the computer to software events that change the display, or the skipping of objects moving relative to other objects in the display in a hesitating, unnatural manner. It would be desirable to overcome these shortcomings of previous technologies.

Another problem related to the invention pertains to the so-called "garbage collector" or equivalent module present in JAVA and many other types of application development software. The garbage collector basically functions to clear a computing device's memory of data not referenced by program code. When it is launched and operating, the garbage collector consumes a significant amount of the computing device's processing power. This can be a significant disadvantage, particularly in graphics applications in which data processing demands are relatively intensive. In addition, the garbage collector can in some circumstances clear data that is needed by the computing device, and thus slow down the computing device by requiring it to regenerate data that was already available before the garbage collector cleared such data. It would be desirable to overcome these disadvantages of the garbage collector.

SUMMARY OF THE INVENTION

The apparatus, methods and articles of the invention have as their objects to overcome the disadvantages of previous technologies as noted hereinabove, and do in fact overcome such disadvantages to achieve significant benefits over previous technologies.

A first method is performed by a computing device. The first method comprises dividing a visible portion of at least one of a plurality of overlapping objects that has changed from a previous to current update cycle into at least one rect object. In dividing the changed visible portion, the computing device uses a graphical hierarchy defining precedence for display of the objects. By determining changed areas of the display, the computing device can be programmed to avoid using processing power on portions of the display that have not changed from a previous to current update cycle. In addition, the computing device can determine the portions of the display requiring update relatively rapidly through use of the rect object(s). The method can comprise determining whether the rect object is obstructed by an overlapping object at a higher level of the hierarchy. If rect object is obstructed by the overlapping object, the method can comprise dividing the rect object into at least one additional rect object. The method can use the rect object to generate a display. The generation of rect object(s) can involve calling a GetRect method of a RectHandler module of the application program. The GetRect method can be used to retrieve or create a rect object from the RectHandler module's data store to set its property values to indicate the rect object's position and size in the display. The computing device can maintain the relationship between the rect object and the object of which it is a part through use of a tree with pointers establishing relationship between an object and its child rect objects that are a part thereof. Upon calling a display module to display the rect object(s), the computing device can supply the rect object as well as the object identity from which the rect object is derived. Such object identity can be determined by virtue of the tree relationship. Accordingly, the display module of the application program can generate the display of the rect object on the computing device's monitor. After display, the computing device can be programmed to clear the tree or tree branch associated with the rect object to free the computing device's memory of data no longer needed for the display in the current update cycle. A DeliverRect method of the RectHandler module can be called by the application program's update module to store the rect object in the RectHandler module's data store. Although the values of the rect object are not reused, its format can be maintained so that the computing device need not regenerate a rect object template or shell upon calling the GetRect method in a subsequent update cycle.

A second method of the invention comprises executing with the computing device an application program for displaying at least first and second objects. The method comprises updating properties including, but not limited to, position and/or size of the first and second objects, based on the execution of the application program. The method comprises parsing the first and second objects to determine whether at least one of the position and size of the first and second objects has changed from the previous to current update cycle. If at least one of the first and second objects has changed from the previous to current update cycle, the method comprises determining at least whether the first and second objects partially overlap. Such determination can be made based on a hierarchy of the first and second objects defined by execution of the application program. The method comprises generating at least one rect object for at least one visible portion of the first and second objects that has changed from the previous to current update cycle. The method further comprises generating display data for the rect object with the computing device, and generating a display on the computing device, based on the display data. The dividing can be performed by projecting at least one edge of the overlapped one of the first and second objects to an edge of the overlapping one of the first and second objects to divide the overlapped object to form at least one rect object. In addition, if the visible portion(s) resulting from division of the changed portion(s) of the display are overlapped by another object(s), such visible portion(s) can again be broken down into smaller rect objects. To accomplish this task, the computing device can determine whether the visible portion is obstructed by an overlapping object. If so, the computing device can project a side edge of the overlapping object to the predetermined boundary to generate the rect object(s). The computing device can generate the display based on the rect object. The generation of the rect objects can be performed by the computing device by calling a GetRect method of a Rect Handler software module of the application program. The GetRect method can either retrieve or create a rect object with value fields associated with properties to indicate at least the position and size of the rect object. After the computing device uses the rect object to generate display data, the computing device can call the DeliverRect method to store the rect object in a data store of the Rect Handler software module for reuse in a subsequent update cycle. The DeliverRect method creates a pointer reference to the rect object so that a garbage collector module associated with the application program does not clear the rect object from the memory of the computing device. The application program can be repeated successively from the lowest to highest object of the display according to the hierarchy defined by the application program.

An apparatus of the invention comprises at least one memory, a processor, and a display unit. The memory stores an application program executable by the processor. The processor is coupled to the memory, and executes the application program to non-redundantly generate display data based on a graphical hierarchy of objects defined by the application program. The processor executes the application program to determine whether any visible objects have changed from a previous to current update cycle. If so, the processor determines whether a changed one of the objects is partially overlapped by another object at a higher level of a graphical hierarchy of objects. If so, the processor divides the overlapped, changed object to generate at least one rect object representing visible rectangular portions of the display. The processor generates display data based on the rect object. The display unit is coupled to the processor, and generates a display based on the display data.

A first article of manufacture of the invention comprises a data storage medium for use with a computing device. The data storage medium stores an application program executable by the computing device to determine whether any visible objects defined by the application program have changed from a previous to current update cycle. If one or more visible objects have changed, the computing device executes the application program to determine whether a changed one of the objects is partially overlapped by another object at a higher level of a graphical hierarchy of objects defined by the application program. If the changed object is overlapped by such other object, the computing device executes the application program to divide the overlapped, changed object into rect objects representing visible rectangular portions thereof. The computing device can further execute the application program to generate display data for display by the computing device, based on the rect object.

A second article of manufacture comprises a data storage medium for storing an application program executable by a computing device. The second article includes a data storage medium for storing an application program. The application program is executable by the computing device to divide a visible portion of at least one of a plurality of overlapping objects that has changed from a previous to current update cycle into at least one rect object. The application program can be executed to define a graphical hierarchy defining precedence for display of the objects that the computing device can use to generate the rect objects.

These together with other objects and advantages, which will become subsequently apparent, reside in the details of construction and operation of the invented methods, apparatus, and article as more fully hereinafter described and claimed, reference being made to the accompanying drawings, forming a part hereof, wherein like numerals refer to like parts throughout the several views.

BRIEF DESCRIPTION OF THE DRAWINGS

FIGS. 1A–1F are views for methods of the invention for determining visible portions of an object that has changed from a previous to current update cycle;

FIGS. 2A–2F are views for methods for determining visible portions of overlapping objects using a graphical hierarchy that establishes the object that takes precedence for display if the objects overlap in the display;

DETAILED DESCRIPTION OF THE INVENTION

Figure 3:
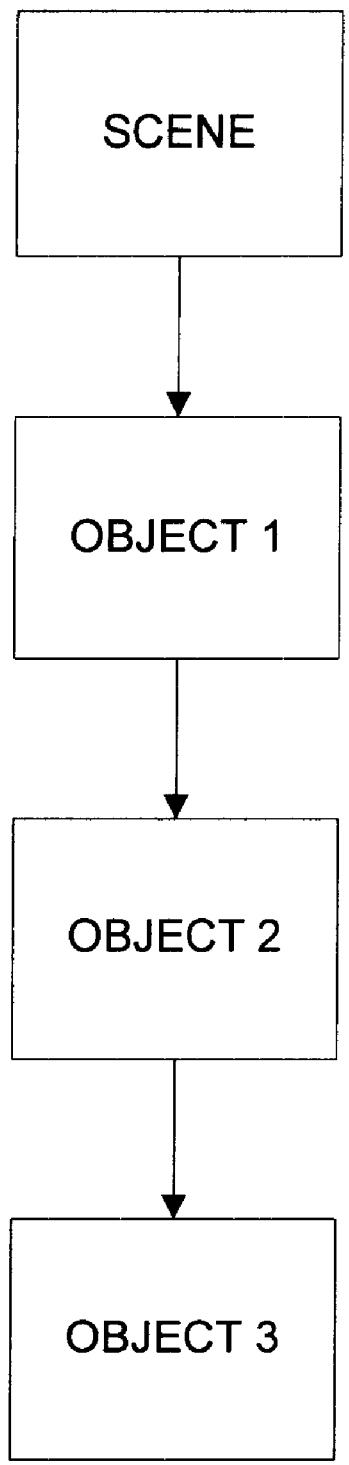
FIG. 3 is a view of an exemplary graphical hierarchy establishing the object that takes precedence for display in the event of overlap with another object.

As used herein, the following terms have the following definitions:

"Application program" refers to software or computer code program that can be executed by a computing device such as a computer so that a human user can interact with such unit.

"Computing device" encompasses within its definition a computer such as personal computer (PCs), a server, a personal digital assistant (PDAs) or like hand-held units, or other devices with the capability to process data. "Coupled" in an electronic sense refers to joining electronic components together with a conductive line such as a wire or cable, or by transmission of signals through air or other media, for example.

"Container object" is an object that contains at least one other object, that is generated on a display of a graphical user interface (GUI) of a computing device.

"Display data" refers to data for pixels or position and size of an object displayed with a computing device.

"Object" can refer to any rectangular object of graphical display, and can be used to refer to object, a container object, a scene, or a rect object.

"Height" refers to the dimension in pixels of an object along a y-axis or vertical direction of a display.

"Input device" refers to a keyboard, mouse, wand, or any other device that can be operated by a user to input commands or data into a client device.

"Method" can refer to a process or to a software module used to perform a particular function, depending upon context.

"Overlapping object" refers to an object that overlies another object of a display.

"Overlapped object" refers to an object that is overlapped by another object of a display.

"Rectangular" refers to objects of a display that have rectangular or square boundaries.

"Rect object" refers to an object used in the division of a larger object into one or more smaller visible parts. The rect object can have properties defining the rect object's position and/or size in the display, as well as other properties.

"(s)" at the end of a word means "one or more." For example, "object(s)" means "one or more objects."

"Scene" refers to a graphical representation of a two- or three-dimensional environment generated in two-dimensions on a display.

"Update cycle" refers to an execution of a series of steps performed to update a display generated by a computing device by execution of an update module of an application program. The computing device is generally programmed to perform the update cycle as often as necessary so that changes appear smooth and natural to the human eye, generally over a one millisecond period or less.

"Width" refers to the dimension in pixels of an object along an x-axis or horizontal direction of a display.

"Z-priority" refers to the display precedence of an object in a graphical hierarchy, and refers to the z-axis or vertical axis that is orthogonal to the x- and y-axis array of pixels defining a display.

In the invented methods, apparatus, and article, determination of visible portions of overlapping objects that have changed from a previous to current update cycle is used to reduce the amount of data processing and length of time required to generate a display with a computing device. FIGS. 1A–1F demonstrate the manner of determining the areas of a display 10 that have changed, and that therefore require update. Like other methods disclosed herein, the method of FIGS. 1A–1F is performed by a computing device as it executes an application program. More specifically, the method of FIGS. 1A–1F is performed by a computing device executing an update module of the application program. The computing device executes the update module over successive update cycles so that changes to the objects caused by execution of the application program appear smooth and natural to the human eye. The update cycle can be performed at a predetermined constant period of one millisecond or less. Alternatively, the update cycle can also be performed on an "as needed" basis in response to the occurrence of a change in one or more of the objects in response to the application program's execution or a user's manipulation of an input device, for example. If the update cycle is performed "as needed" the response time to the event should be one millisecond or less relative to the time of the event to provide a natural appearance for the display.

In FIGS. 1A–1F "object 1" refers to the position and size of the "object 1" in the current update cycle, and "object 1'" refers to its position and size in the previous update cycle. In FIG. 1A, the object 1 has moved in the display 10 relative to the previous cycle from right to left along the x-axis direction. Accordingly, the areas of object 1 and object 1' are both required to be updated in the current update cycle. However, other areas of the scene 11 do not require update. In FIG. 1B, the width and height of the object 1' has enlarged to object 1 which totally overlaps the object 1'. Accordingly, object 1 must be entirely updated over its full width and height in the current update cycle, but no update is required for other areas of the scene 11. In FIG. 1C the object 1 has moved from left to right from the previous to current update cycle, but still overlaps a rectangular area 1.1 of the object 1' at the previous position of object 1. Accordingly, the rectangular area 1.1 and the object 1 are to be updated in the current cycle. The rectangular area is defined by the position and size of the object 1' truncated at the edge of the object 1 at its current position. In FIG. 1D, the object 1 has changed position in both x and y axis directions relative its position in the previous cycle denoted by the object 1'. A side edge of the object 1 is projected along the y-axis direction to divide the object 1' into two rectangular areas 1.1, 1.2. The computing device therefore updates the display 10 with the rectangular areas 1.1, 1.2 and the entirety of the object 1. All other portions of the scene 11 remain the same. In FIG. 1E, the object 1 has both shrunk in size and moved its position relative to the previous update cycle. Projecting a side edge of the object 1 within the object 1' produces three rectangular areas 1.1, 1.2, 1.3. The areas of the display 10 requiring update are therefore those covered by object 1 and rectangular portions 1.1, 1.2, 1.3. All other portions of the scene 11 remain unchanged. In FIG. 1F the object 1 has shrunk in size and has also been translated relative to its position in the previous update cycle. Projecting the side edges of the object 1 along the y-axis direction to edges of the object 1' yields areas to be updated. Namely, the object 1 and rectangular areas 1.1, 1.2, 1.3, 1.4 require update. All other areas of the scene 11 remain the same. FIGS. 1A–1F are representative cases of the manner in which an object can change from one update cycle to the next, and the rectangular areas requiring update upon change of the object.

FIGS. 2A–2F demonstrate a basic methodology used to determine visible portions of the rectangular objects so that display data for the non-visible portions of the objects need not be subjected to unnecessary data processing. In FIGS. 2A–2F the graphical objects of the display 10, object 1 and object 2, have a predetermined relative hierarchy. Namely, the object 1 is at a lower level of the display hierarchy than the object 2. Accordingly, if the objects 1 and 2 overlap, the computing device generates the display 10 to include in the overlapped region the object 2 rather than object 1. FIG. 2A shows a situation in which there is no overlap between the objects 1 and 2 on the display. Therefore, both objects 1 and 2 are visible, and the computing device generates display 10 to include both objects. In FIG. 2B object 1 and object 2 totally overlap. Because object 2 is at a higher level of the hierarchy than object 1, object 1 is not visible. Accordingly, the computing device does not generate display data for the object 1 that is non-visible in the example of FIG. 2B. FIGS. 2C–2F illustrate situations of partial overlap between the object 1 and the object 2. Because in the example of FIG. 2C object 1 and object 2 have the same height along the vertical or y-axis direction, the effect of the overlap is to partially block object 1 from view on the display. The visible rectangular portion 1.1 is therefore the only portion of the object 1 that can be viewed in FIG. 2C. In FIG. 2D the objects 1 and 2 partially overlap, and the object 1 can be divided into two rectangular portions 1.1, 1.2 defined by projecting the edge of the object 2 to the boundary of the object 1, as shown by the broken line. Therefore, the computing device can generate the display 10 to include the visible portions 1.1, 1.2 without processing data for the object 1 in the region overlapped by the object 2. In FIG. 2E, the object 2 overlaps the object 1, and projection of the edge of the object 2 that is within object 1 along the y-axis or vertical direction results in the formation of three visible rectangular portions 1.1, 1.2, 1.3. In FIG. 2F, the object 2 is contained within the object 1. Projection of the side edges of the object 2 along the y-axis or vertical direction to the boundary of the object 1 results in division of the object 1 into four visible rectangular portions 1.1, 1.2, 1.3, 1.4. FIGS. 2A–2F representative examples of determination of visible portions of two partially overlapping objects. Of course, the determination of visible portions of the display 10 becomes more complicated as more objects are added to such display. The basic operations of FIGS. 1A–1F and 2A–2F are applied as appropriate to determine changed regions of a display. The visible portions of the objects, rectangular areas 1.1, 1.2, 1.3, 1.4 in FIGS. 1A–1F and 2A–2F are represented by 'rect objects'.

FIG. 3 indicates an exemplary hierarchy of objects. The hierarchy of FIG. 3 is representative only of a particular hierarchy chosen for explanation of the invented methods, apparatus, and article with reference to FIGS. 4A–4I and FIGS. 5A–5F. It is not intended to limit the nature or number of objects or graphical hierarchy as these are defined by programming and execution of the application program and/or events generated by a user of the computing device. The purpose of the graphical hierarchy is to define the relationship or 'z-priority' as to the object that takes precedence for display in the event of an overlap with another object on the display. Such hierarchy data is generally predetermined by the application program used by the computing device to generate the display 10. In FIG. 3, the hierarchy between objects runs from the scene at the lowest hierarchical level, to the object 3 at the highest hierarchical level. Therefore, the objects 1, 2, 3 take precedence for display over the scene in the areas where such objects overlap the scene. In the event of overlap between objects 1 and objects 2 or 3, objects 2 or 3 take precedence for display. In the event of overlap between objects 2 and 3, object 3 takes precedence for display over object 2. The scene object is considered a 'container object' because it contains other objects within it. A container object is programmed to be responsible for updating the objects it contains. The container object updates contained object(s) by determining their visible portions for display at successive update cycles in response to the computing device executing its application program to render the objects on its display.

FIGS. 4A–4E and 5A–5C demonstrate the basic method of this invention to generate an exemplary display 10. The method is implemented on a computing device to generate a display 10 by executing an application program. As with all FIGURES disclosed herein, those of ordinary skill in this art should understand that the objects depicted in FIGS. 4A–4E and 5A–5C are exemplary only. Their position and size in the display, and/or changes in the objects over update cycles, are in no way limiting of the invention. An important focus of the invention is directed to the manner of determining visible display areas that have changed, and that therefore require update relative to a previous update cycle. Those of ordinary skill will understand that this purpose is not dependent upon the nature, size or position of the objects or the manner in which they may change over time.

Figure 4A:
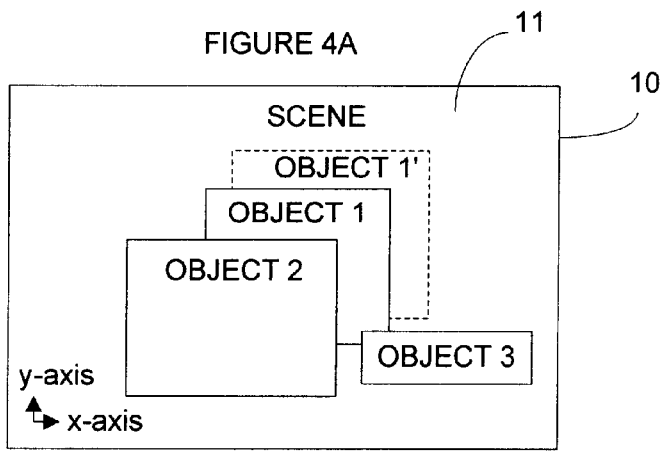
FIGS. 4A–4C are views of different stages for generating a display of objects by determining visible portions of overlapping objects.
Figure 4B:
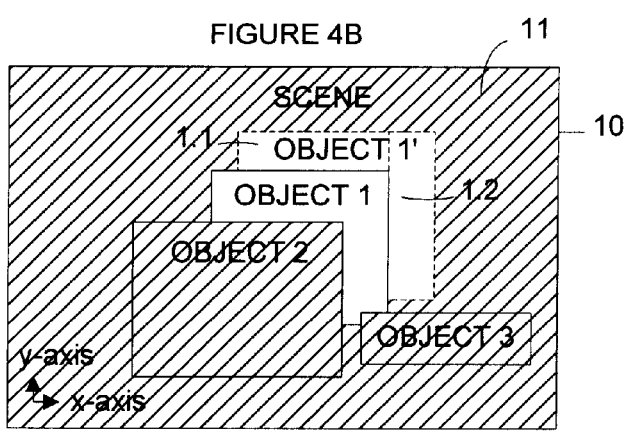
Figure 5A:
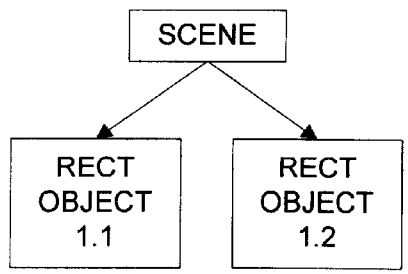
FIGS. 5A–5F are schematic views of tree branches for display objects and rectangular portions derived therefrom.
Figure 4C:
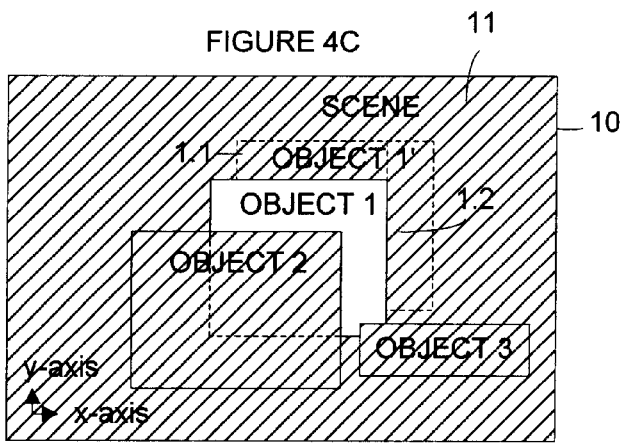
Figure 5B:
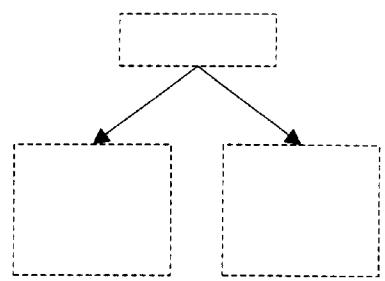
Figure 4D:
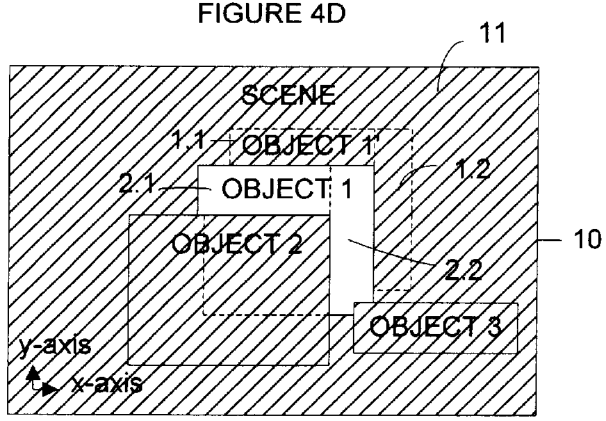
Figure 5C:
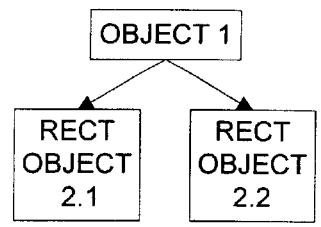
Figure 4E:
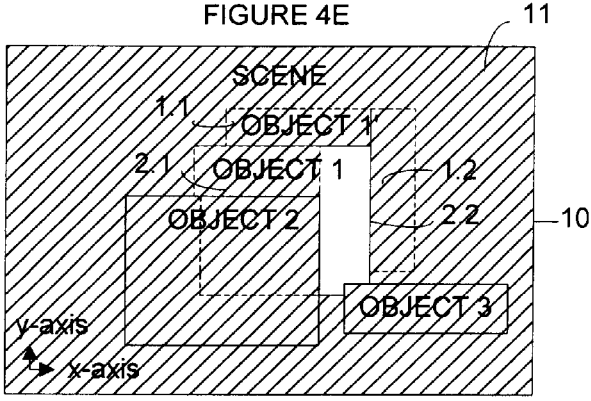
Figure 5D:
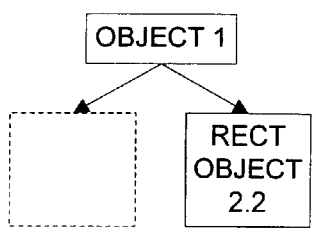
Figure 4F:
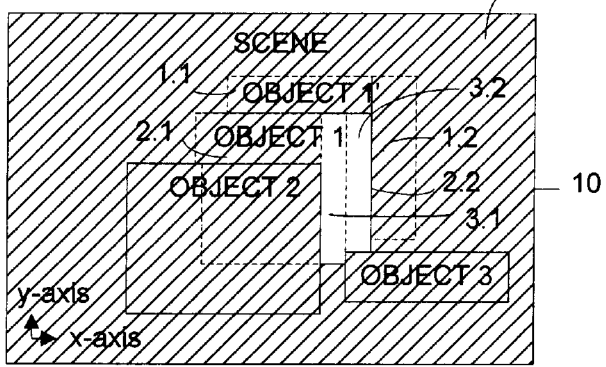
Figure 5E:
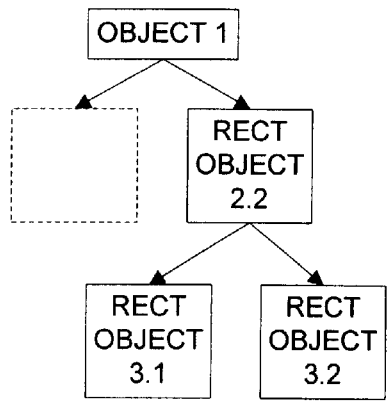
Figure 4G:
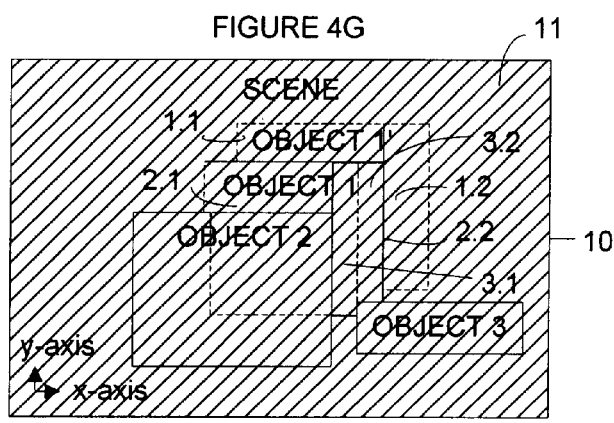
Figure 5F:
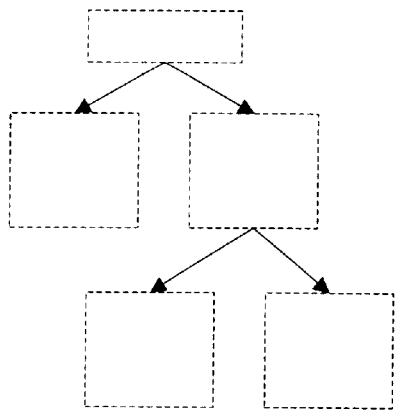

As shown in FIG. 4A, the object 1 has moved over one update cycle to the next while the scene 11 and objects 2, 3 have not changed position or size. In FIG. 4B the computing device determines that the cross-hatched portions of the scene 11, the object 2 and the object 3, have not changed over the update cycle. Therefore, the computing device will not regenerate display data for these portions of the display, thus saving a significant amount of unnecessary data processing. Also, in FIG. 4B, the computing device 11 projects the edge of the object 1 along the y-axis direction to the edge of its previous position denoted by as the object 1'. This procedure forms to rect objects 1.1, 1.2. In FIG. 5A, the computing device prepares a tree with the scene 11 and at the next level of the tree the rect objects 1.1, 1.2. These rect objects are retrieved by the computing device by twice calling the GetRect method of its RectHandler module. The computing device either creates or retrieves existent rect objects from the RectHandler module and sets these with the properties defining the position and size of the rect objects 1.1, 1.2. In FIG. 4C the computing device determines whether the rect objects 1.1, 1.2 are overlapped by an object at a higher level of the graphical hierarchy. In this example, no such object overlaps the rect objects 1.1, 1.2. Accordingly, in FIG. 4C the computing device calls a display module of the application program and provides the display module with the rect objects 1.1, 1.2 as well as the identity of the scene object from which they are derived. The computing device executes the display module to generate a display of the rect objects 1.1, 1.2 as indicated by the cross-hatching in FIG. 4C. The computing device calls the DeliverRect method of the RectHandler module. The DeliverRect method delivers the used rect objects 1.1, 1.2 to the RectHandler module for reuse in a subsequent update cycle. The calling of the DeliverRect method clears the tree created by the computing device of rect objects 1.1, 1.2, as represented by empty boxes in FIG. 5B. This clearing of the tree frees the computing device's memory from storing data for the rect objects 1.1, 1.2 no longer needed for the display. In addition, the calling of the DeliverRect method creates pointer references to the rect objects 1.1, 1.2 so that they will not be cleared from the computing device's memory by a "garbage collector" or like software module. The computing device turns to examination of the next object in the hierarchy, the object 1. The computing device determines the visible portions of the object 1 by projecting the edge of the object 2 along the y-axis direction to the edge of the former object, forming rect objects 2.1, 2.2. The computing device performs this action by twice calling the GetRect method, and setting the returned rect objects with the properties defining the position and size of the rect objects 2.1, 2.2. The computing device creates the tree of FIG. 5C to indicate that the visible portion of object 1 has been broken down into the rect objects 2.1, 2.2. The computing device compares the rect object 2.1 with the higher-level objects of the hierarchy and determines that the rect object 2.1 is not overlapped by any such objects. In FIG. 4E the computing device calls the display module of the application program and supplies the display module with the rect object 2.1 and the identity of the object 1 from which such rect object was derived. The computing device executes the display module to generate the display of the rect object 2.1 on its monitor. In FIG. 5D, the computing device calls the DeliverRect method to clear the tree of the rect object 2.1 that is no longer needed to generate the display. The calling of the DeliverRect method creates pointer references to the rect object 2.1 so that it will not be cleared from the computing device's memory by a "garbage collector" or like software module. This permit the rect object template or shell to be set with different values for a rect object generated in a subsequent cycle. In FIG. 4F the computing device examines the rect object 2.2 with other objects at higher-levels of the hierarchy. Although rect object 2.2 is not overlapped by object 2, it is by object 3. Accordingly, the computing device projects the edge of the object 3 to the edge of the rect object 2.2 to form rect objects 3.1, 3.2. The computing device twice calls the GetRect method and sets the returned rect objects with property values for the position and size of the rect objects 3.1, 3.2. As shown in FIG. 5E the computing device updates the tree with the two rect objects 3.1, 3.2. In FIG. 4G the computing device compares the rect objects 3.1, 3.2 with objects at higher levels of the hierarchy. Finding no overlap, the computing device calls the display module and forwards the rect objects 3.1, 3.2 to the display module along with the identity of the object 1 from which they were derived. The computing device executes the display module to generate the display of the rect objects 3.1, 3.2 as indicated by cross-hatching in FIG. 4G. In FIG. 5F the computing device determines that no further rect objects for object 1 need by considered. The computing device therefore calls the DeliverRect method three times to deliver rect objects 2.2, 3.1, 3.2 back to the RectHandler module for possible reuse in a subsequent update cycle. This clears the tree of the rect objects 2.2, 3.1, 3.2, as shown in FIG. 5F, and also creates pointer references to these rect objects so that their templates or shells can be reused if need in subsequent update cycles.

An exemplary format for the coding of objects or rect objects such as scene 11 and objects 1, 2, or rect objects 1.1, 1.2, 2.1, 2.2 is shown below:

<obj/ object name="object #"; invalid="true" or "false"; visible="true" or "false"; xoffset=0,1, . . . ,x; yoffset= 0,1, . . . ,y xfieldwidth=0,1, . . . ,x; yfieldwidth=0,1, . . . ,y; xrefpoint=0,1, . . . ,x; yrefpoint=0,1, . . . ,y; prevxoffset=0,1, . . . ,x; prevyoffset=0,1, . . . ,y; prevxfieldwidth=0,1, . . . ,x; prevyfieldwidth=0,1, . . . ,y; prevxrefpoint=0,1, . . . ,x; prevyrefpoint=0,1, . . . ,y; imagefileresource= "imagefilename.bmp"; border=0,1, . . . ,x/2; color= 'luminscence, intensity, hue'; containedobj="object *"/obj>.

The object name property has a value that defines the name of the object for purposes of referencing it from other portions of the code. The 'invalid' field has a value that indicates whether any property affecting the display has changed from the previous to current update cycle. If the application program changes one of the properties affecting the display of the object as it executes, it sets invalid to 'true'. On the other hand, if the properties affecting display of the object are not changed, the application program sets the invalid property to 'false'. The 'visible' property indicates whether the object is visible, and can have values either 'true' or 'false'. Visibility can be dependent upon events defined in the application program and/or generated by a user via an input device, although this is not the case in this particular example. The 'xoffset' field defines the position of the object by distance in pixels along the x-axis direction of the display from the 'xrefpoint' reference relative to the upper right hand corner of the object. The number 'x' represents the last pixel in a row on the display screen. 'X' is defined by the size of the display 10, and is generally 640 or 1,024, for example, depending upon the particular display. The 'yoffset' field defines the position of the object by distance in pixels along the y-axis direction from the 'yrefpoint' reference relative to the upper right hand corner of the object. Y is defined by the size of the display 10, and can be 480 or 768, for example. 'Xfieldwidth' and 'yfieldwidth' define the width and height, respectively, of the object in terms of pixels. The 'prevxoffset', 'prevyoffset', 'prevfieldxwidth', 'prevfieldywidth', 'prevxrefpoint', and 'prevyrefpoint' are the previous update cycle's xoffset, yoffset, xfieldwidth, yfieldwidth, xrefpoint, and yrefpoint. The values of these properties can be used to determine portions of the object requiring update from the previous update cycle by comparison of current and previous values to determine whether any such value has changed. Those of ordinary skill in the art will readily appreciate that the above properties and their values can readily be used to determine portions of objects or rect objects requiring update for display. Because considerable formatting of the rect objects is required to identify its fields, the computing device can be programmed to prefer retrieving a rect object from the RectHandler module to creating a new one.

Figure 6:
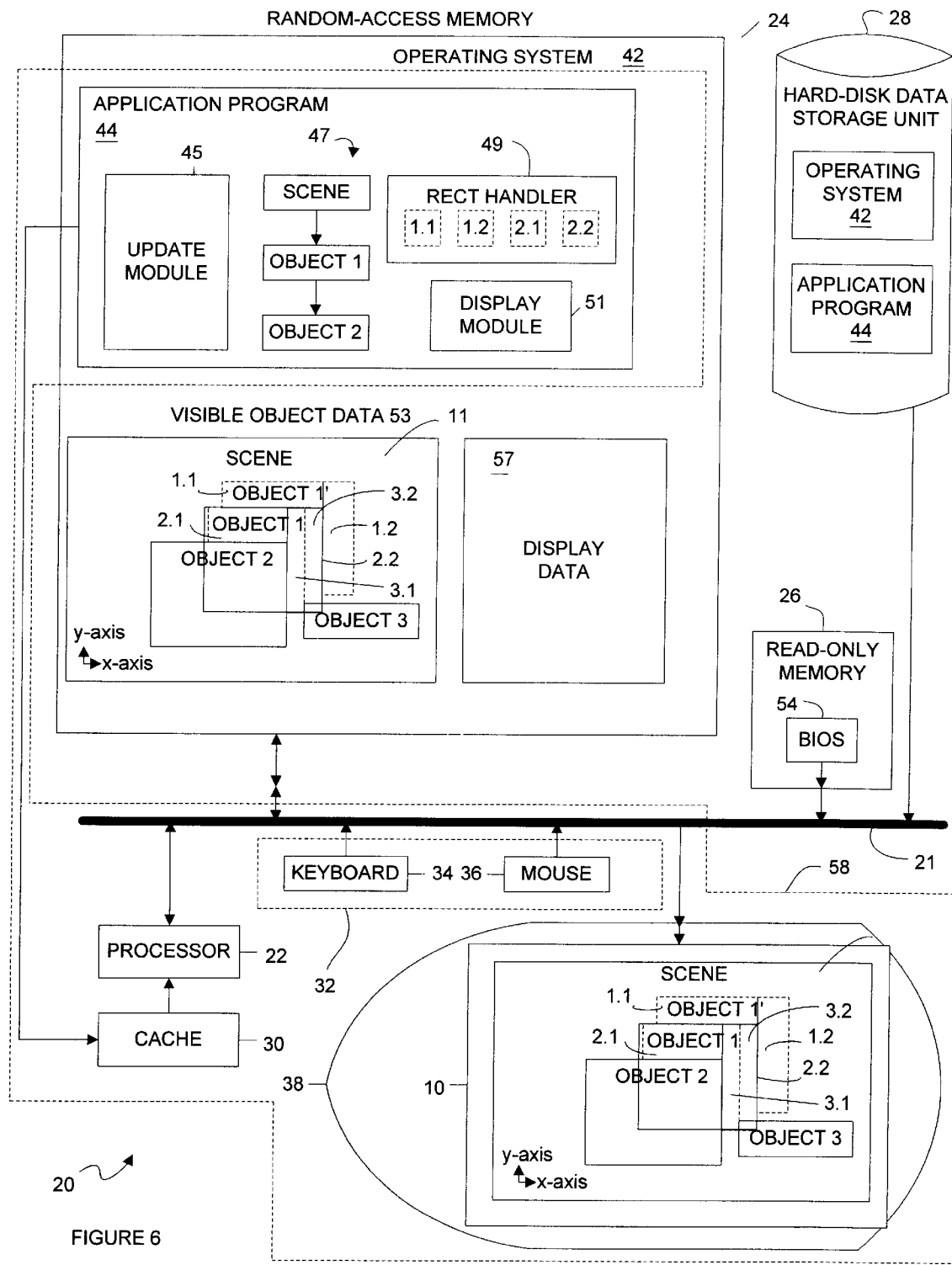
FIG. 6 is a block diagram of a computing device in accordance with the invention.

FIG. 6 is a block diagram of an example of a computing device 20 that can be used to implement the apparatus and method of the invention. The computing device 20 can include processor 22, random-access memory (RAM) 24, read-only memory (ROM) 26, hard-disk storage unit 28, cache 30, input devices 32 including keyboard 34 and mouse 36, and display unit 38. The computing device 20 also includes a bus 21 to which the above-identified components of the device are coupled. The computing device 20 can be one of many devices, including personal computers commercially-available from Dell® Corporation, Round Rock, Tex., Compaq® Corporation, Houston, Tex., and others. The processor 22 can be a microprocessor such as a Pentium® I, II or III, Pentium Prog, Celeron®, or Merced® microprocessor produced by Intel® Corporation, Palo Alto, Calif., an Athlon® or K7-generation microprocessor produced by Advanced Micro Devices®, Inc., Palo Alto, Calif., or an equivalent or more advanced generation of microprocessor operating at 100 MegaHertz or higher. Alternatively, the processor 22 can be implemented as a microcontroller, programmable logic array (PLA), field programmable logic array (FPLA), programmed array logic (PAL), or other processing device. The processor 22 is coupled to the RAM 24. The RAM 24 can have a memory capacity on the order of one or more megabytes, with word size of thirty-two bits or more, for example. The RAM provides relatively high-speed data and program access to the processor 22. The ROM stores data in a non-volatile fashion, and is generally on the order of tens to hundred of kilobytes with word size of thirty-two kilobytes or more. The RAM 24 stores the operating system 42 that enables interaction between the processor 22, the hard-disk storage unit 28, the input device (s) 32, and the display unit 38. The RAM 24 also stores an application program 44 that the processor 22 executes to non-redundantly generate display data for the visible portions of the display 10. The application program 44 includes various software modules and data stores in the RAM 24. These include the update module 45, the objects 47 of the display and their associated hierarchy, the RectHandler module 49, and the display module 51. The RAM 24 also stores visible object data 53 corresponding to the visible areas of the display 10 that require update from the previous update cycle, as well as display data 57 that defines all objects of the display 10. The display data 57 can be luminance, chrominance, and hue values for all pixels defining the display 10, for example. The ROM 26 stores a binary input/output system (BIOS) 52 for the processor 22. Upon power-up of the computing device 20, the processor 22 executes the code of the BIOS 52. The BIOS 52 contains data required by the processor 22 to establish communication between the processor 22 and the hard-disk data storage unit 28, and loads the application program 44 into the RAM 24 where such program can be executed. This communication permits the processor 22 to retrieve the operating system 42 from the hard-disk data storage unit 28 and to load the operating system into the RAM 42. The operating system 42 enables the processor 22 to establish communication with the input device(s) 32, as well as the display unit 38. The hard-disk data storage unit 28 stores the operating system 42 and the application program 44 in a non-volatile manner so that such code and data can be retrieved from the hard-disk data storage unit 28. The hard-disk data storage unit 28 can be a magnetic storage medium such as a hard-drive commercially-available from numerous sources, for example. The cache 30 is a relatively high-speed buffer or memory that stores and optionally pre-processes instructions from the application program 44. Such caches are well-known and are generally integrated along with the processor 22 on a single semiconductor chip. The input device(s) 32 can include a keyboard, mouse, wand or other device. In FIG. 6, the input device(s) 32 include keyboard 34 and mouse 36. The input device(s) 32 can be manipulated by a user to load and execute the application program 44 via the operating system 42 and the processor 22. The display unit 38 can be a standard cathode-ray tube (CRT) or flat-panel display such as one of numerous types commercially-available from Dell® Corporation, Compaq® Corporation, Gateway® Corporation, and others. The processor 22 executes the application program 44 in the RAM 24 to generate display data, and supplies the display data to the display unit 38 via the bus 40 to generate display 10 for the visible portions of the displayed objects. The processor 22, input device(s) 32, the display unit 38, and portions of the application program 44 that define the interface used by the user of the computing device 20 to interact therewith constitute the graphical user interface (GUI) 54 of the computing device 20.

Figure 7A:
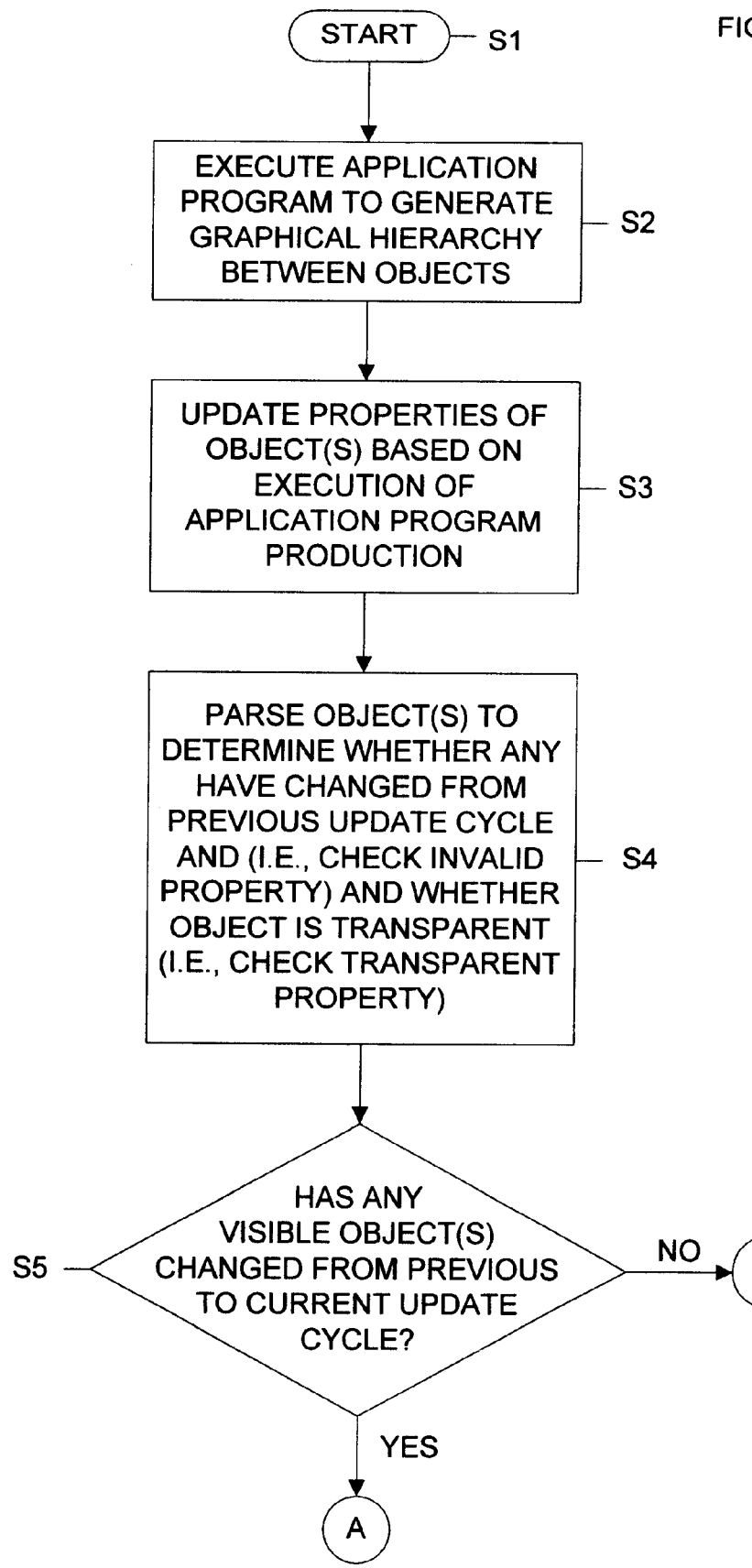
FIGS. 7A–7C are flowcharts of methods of processing performed by the computing device to determine visible portions of objects due to change in the objects from previous to current update cycles.
Figure 7B:
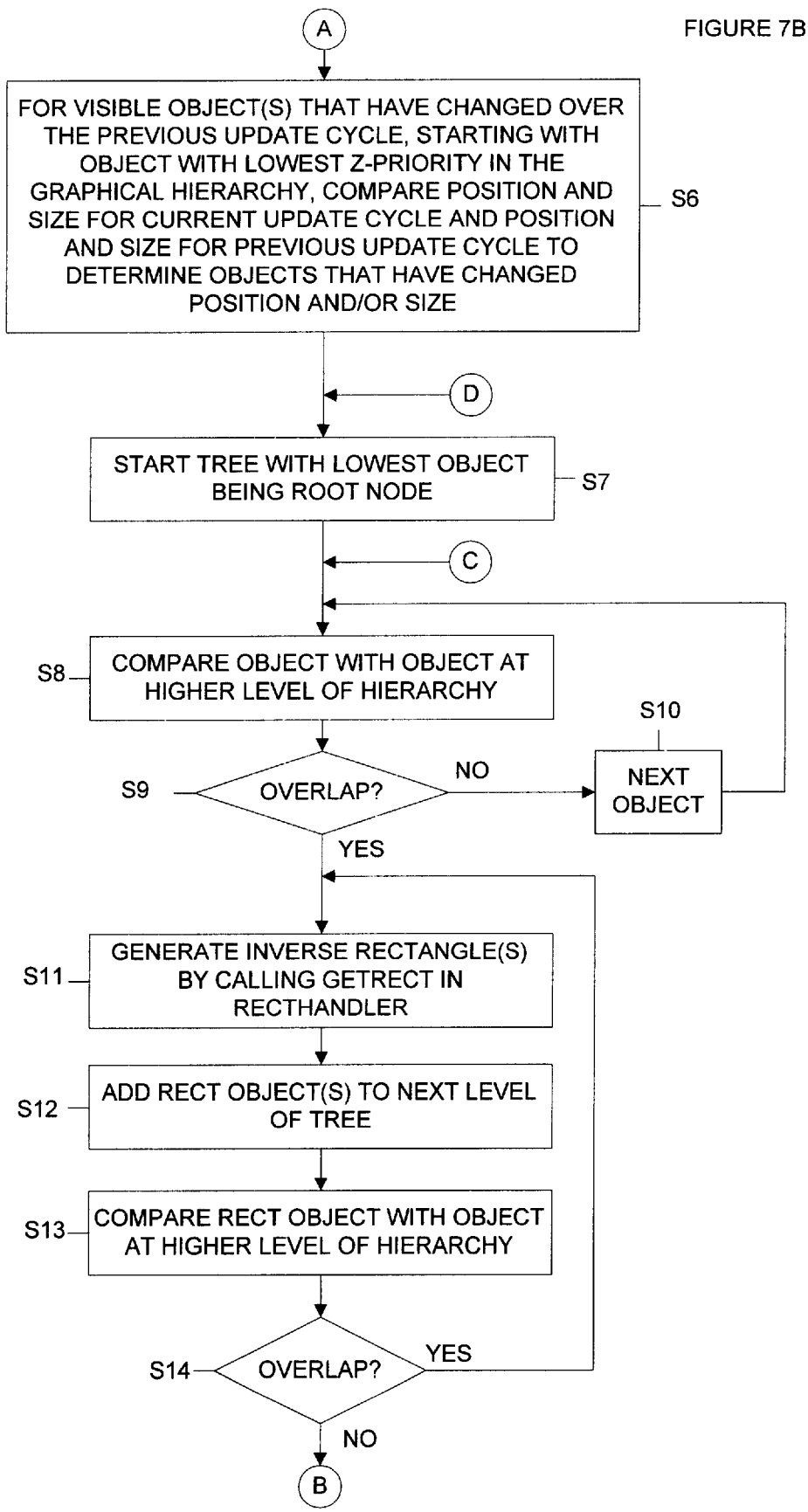
Figure 7C:
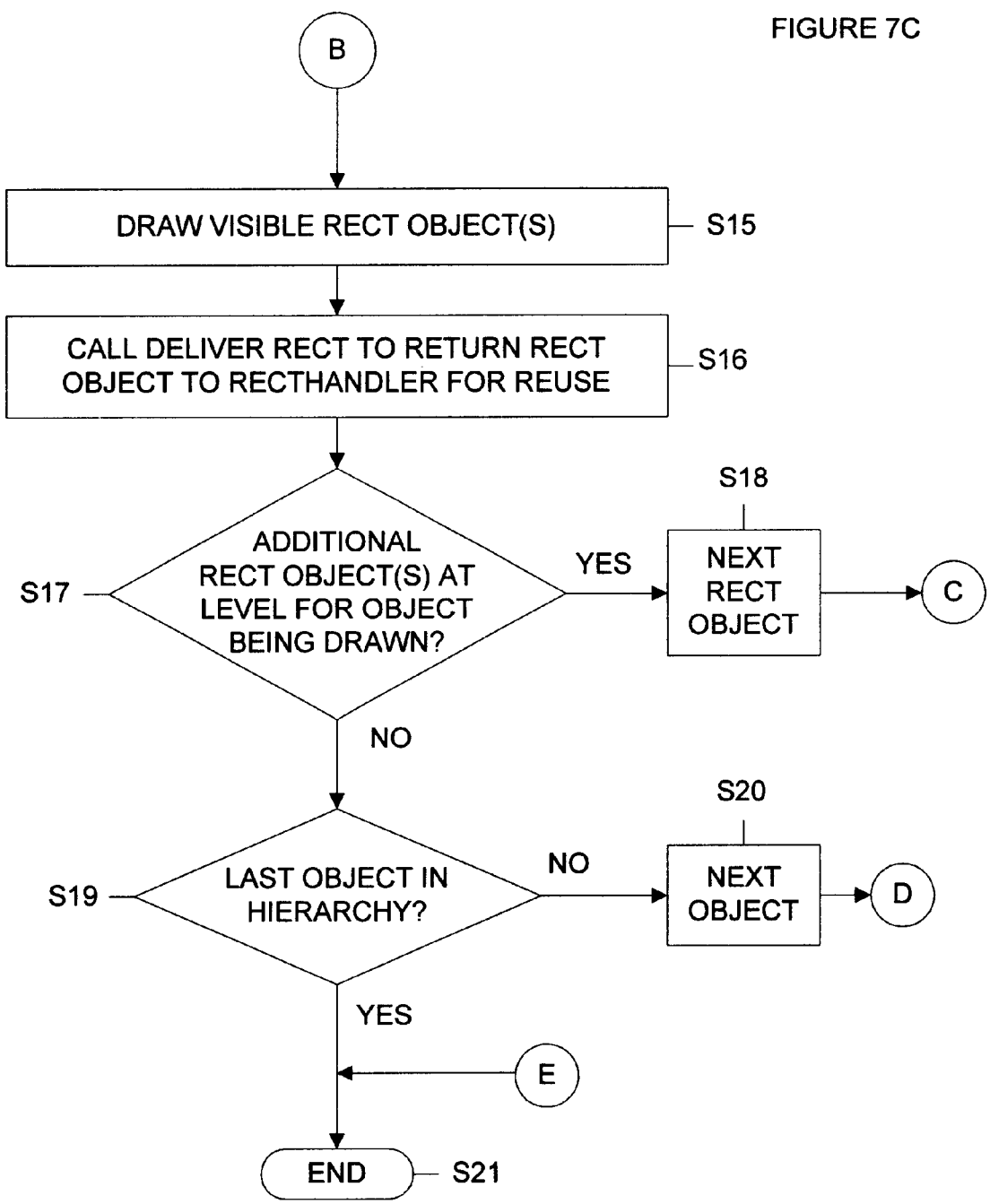
Figure 8:
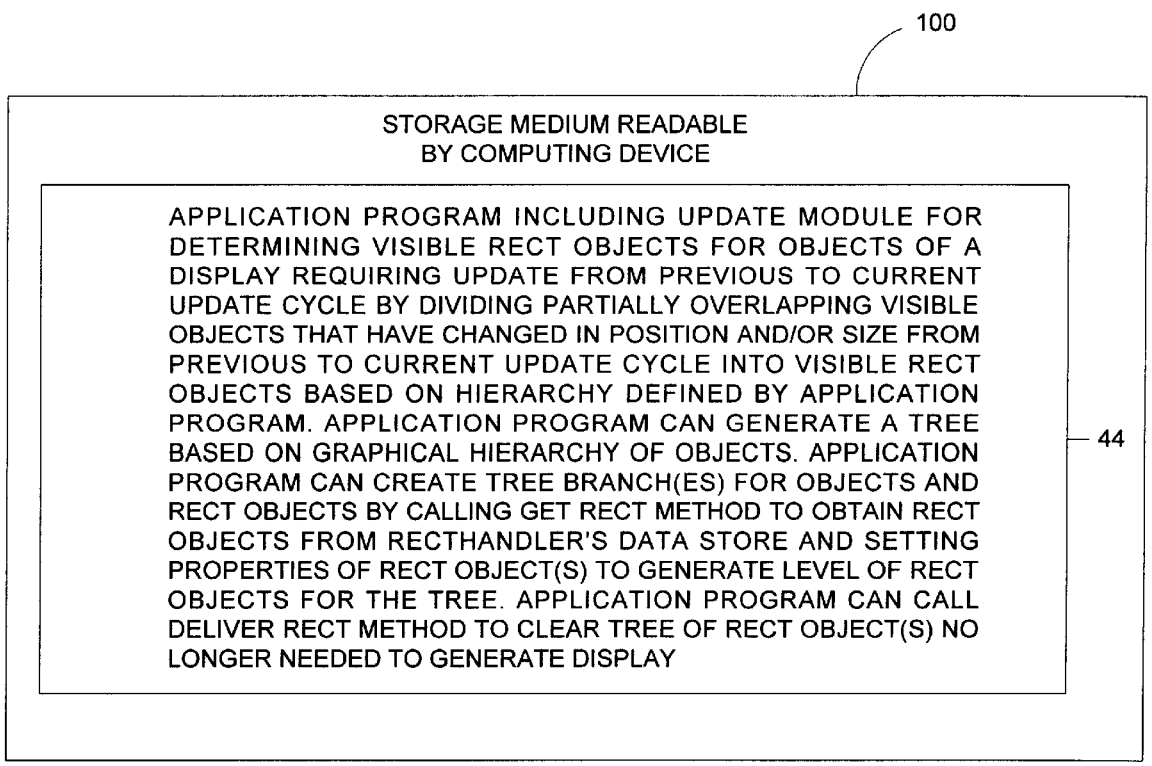
FIG. 8 is a diagram of a storage medium for storing an application program in accordance with the invention.

FIGS. 7A–7C are general flowcharts of the method of the invention. The computing device 20 can execute its application program to perform the method of FIGS. 7A–7C. In step S1, the method of FIGS. 7A–7C begins. In step S2, the computing device 20 executes the application program 44 that defines the hierarchy between different objects that can be displayed. In step S3 the computing device 20 updates the properties of object(s) of the display. The properties of the object(s) are updated as the computing device executes the application program. Therefore, during an update cycle, the computing device 20 may or may not change values of the properties of the objects of the display, depending upon the application program and events that impact its execution. In step S4 the computing device 20 parses the object(s) of the application program to determine whether any have changed from the previous update cycle as a result of execution of the application program. The computing device 20 can perform this task by checking the invalid property(ies) of the object (s) of the application program. Also, in step S4, the computing device 20 determines whether any object(s) is transparent by checking its visible property. Transparent objects are treated as not overlapping other object(s) for purposes of generating the display. In step S3 the computing device 20 determines whether any visible object has changed from the previous to current update cycle based on the parsing of step S4. If so, in step S6 of FIG. 7B, the computing device 20 compares for the visible object(s) that have changed over the previous update cycle. The computing device 20 does so by comparing the position and size of the object for the current update cycle with the position and size of the object in the previous update cycle. The determination of rect objects for the visible portions of changed areas of the display due to change in position and size of object(s), as well as overlap of object(s) at different levels of the graphical hierarchy, is determined in a similar manner. More specifically, in step S7, the computing device 20 starts a tree with the lowest object being the root node. In step S8, the computing device 20 compares the changed area of the display 10 or an object thereof with at least one object at a higher level of the hierarchy. In step S9 the computing device 20 determines whether the changed area or object overlaps with one at a higher level of the display 10. If not, in step S10, the computing device 20 advances to the next object to be analyzed for partial overlap with other objects. On the other hand, if the determination in step S9 is affirmative, in step S11 the computing device 20 generates rect object(s) for rectangular areas of the changed area or overlapped object. The computing device 20 generates the rect object(s) by calling the GetRect method of the RectHandler module. In step S12 the computing device 20 compares the rect object (s) with an object, if any, at a higher level of the hierarchy. In step S13 the computing device 20 generates a rect object(s) by calling the GetRect method of the RectHandler module. In step S14 the computing device 20 determines whether there is any overlap between the rect object and any object at a higher level of the graphical hierarchy. If so, processing performed by the computing device 20 returns to step S11. On the other hand, if the determination in the step S14 is negative, in step S15 of FIG. 7C, the computing device 20 draws the visible rect object(s). The computing device 20 can perform this function by calling a display module of the application program and supplying the visible rect objects and the identity of the object from which they were derived to such display module. In step S16 the computing device 20 calls the DeliverRect method to return the rect object(s) drawn in step S16 to the RectHandler module's data store for reuse. In step S17 the computing device 20 determines whether there are any additional rect object(s) at the level for the object being drawn. If so, the computing device performs advances to the next rect object and returns to step S8. On the other hand, if the determination in step S17 is negative, in step S19 the computing device 20 determines whether it has processed the last object in the graphical hierarchy. If not, in step S20, the computing device 20 advances to the next object in the hierarchy that changed during from the previous to current update cycle. The computing device 20 returns to perform step S7 and subsequent steps for the next object. On the other hand, if the determination in step S19 is affirmative, or if the determination in step S5 is negative, the method of FIGS. 7A–7C ends in step S21. The method of FIGS. 7A–7C can be executed by the computing device 20 periodically, e.g., every one millisecond or less during execution of its application program. Alternatively, the method of FIGS. 7A–7C can be executed as needed to maintain currency of the state of the display objects changed in response to events generated by execution of the application program or a user's manipulation of an input device for the computing device. Considerable savings in terms of processing time committed by the computing device 20 is made possible by using the RectHandler module for storage and supply of rect objects. With application programs developed using programming languages such as JAVA, a "garbage collector" or like software module clears data not referenced by the code of the application program 44 from the memory 24. This feature is often touted as advantageous over C++ programming languages in which the programmer must be diligent to clear the memory of data not referenced by the application program code. However, in graphics applications, the inventors have determined that clearing display data associated with rectangular portions calculated by the computing device 20 can often significantly degrade performance and speed of its processor 22 in generating the display 10 because cleared data often must be regenerated. To solve this problem, the application program of the invention is coded with a rectangle handler object or module RectHandler. This RectHandler object has two methods, GetRect and DeliverRect. If the application program calls the GetRect method with argument identifying the rect object, e.g., in the performance of step S12 of FIG. 7B, for example, the RectHandler module delivers the rect object if one is present in its data store. Otherwise, the RectHandler module creates a new rect object if none is available in its data store. The RectHandler module and its GetRect method act to create a pointer reference to the rect object that prevents the JAVA garbage collector from clearing such rect object from the RAM 24. More specifically, if the garbage collector encounters data that is not referenced by program code, it will automatically clear this data from the RAM 24. The RectHandler object delivers the display data from the data store 52 to the processor 22. On the other hand, in the performance of the step S19 of FIG. 7C, the processor 22 stores the properties of a rect object such as those defining its position and size, by calling the DeliverRect method of the RectHandler module. Calling the DeliverRect method causes the computing device 20 to clear the tree branch associated with the rect objects. Therefore, the computing device 20 frees the RAM 24 from tree branches no longer needed to generate the display 10. The DeliverRect method of the RectHandler object also permits rect objects to be reused. This reduces processing time required by processor 22 to generate the display 10 because it does not have to create rect objects already in the RectHandler's data store. FIG. 8 is an article of manufacture of the invention, namely, a data storage medium 100 readable by the computing device 20. The medium 100 stores the application program 44, and optionally also the hierarchy data 46 and the display data 50. The data storage medium 100 can be any data storage medium including, but not limited to, magnetic storage media such as floppy-disks, cassette tapes, etc., optical storage media such as compact discs (CDs), digital video disc (DVD), or other media. The application program 44 stored in the data storage medium 100 can be used to generate visible rect objects for changed areas of an object from a previous to current update cycle from requiring display data by dividing partially overlapping objects into smaller visible rectangular objects. The hierarchy data defines the level or priority of display of the objects of the display. The display data for the objects includes respective position and size data defining the position and x, y coordinate dimensions of the objects.

Many variations of the disclosed methods, apparatus, and article are possible without departing from the scope of the invention. For example, in FIGS. 1C–1F, FIGS. 2C–3F, and 4B–4G, the projection of the object edges to form rect objects can be performed along the x-axis or horizontal direction rather than the y-axis or vertical direction.

Any trademarks listed herein are the property of their respective owners, and reference herein to such trademarks is intended only to indicate the source of a particular product or service.

The many features and advantages of the present invention are apparent from the detailed specification and it is intended by the appended claim to cover all such features and advantages of the described methods and apparatus which follow in the true scope and spirit of the invention. Further, since numerous modifications and changes will readily occur to those of ordinary skill in the art, it is not desired to limit the invention to the exact implementation and operation illustrated and described. Accordingly, all suitable modifications and equivalents may be resorted to as falling within the scope and spirit of the invention.

What is claimed is:

1. A method performed by a computing device, the method comprising the steps of:

a) dividing a visible portion of at least one of a plurality of overlapping objects that has changed from a previous to current update cycle into at least one rect object, using a graphical hierarchy defining precedence for display of the objects with the computing devices,
   the step (a) being initiated by calling a GetRect method of a RectHandler module, and
   the calling of the GetRect method creating the rect object with at least one property set by the computing device to define at least one of the position and size of the visible portion of the object to which the rect object pertains on a display generated by the computing device.

2. A method as claimed in claim 1 further comprising the steps of:
  b) determining whether the rect object is obstructed by an overlapping object at a higher level of the hierarchy; and
  c) if the rect object is obstructed by the overlapping object, dividing the rect object into at least one additional rect object.

3. A method as claimed in claim 1 further comprising the steps of:
  b) generating display data based on the rect object; and
  c) generating a display based on the display data.

4. A method for use by a computing device, the method comprising the steps of:
  a) executing with the computing device an application program for displaying at least first and second objects;
  b) updating properties including at least one of position and size of the first and second objects, based on the execution of the application program in the step (a);
  c) parsing the first and second objects to determine whether at least one of the position and size of the first and second objects has changed from the previous to current update cycle;
    if at least one of the first and second objects has changed from the previous to current update cycle,
  d) determining whether the first and second objects partially overlap, based on a hierarchy of the first and second objects defined by execution of the application program in the step (a);
  e) generating at least one rect object for at least one visible portion of the first and second objects that has changed from the previous to current update cycle, based on the determining of the steps (c) and (d);
  f) generating display data for the rect object with the computing device; and
  g) generating a display on the computing device, based on the display data.

5. A method as claimed in claim 4, wherein the step (e) includes:
  e1) projecting at least one edge of the overlapped one of the first and second objects to an edge of the overlapping one of the first and second objects to divide the overlapped object to form at least one rect object.

6. A method as claimed in claim 5 wherein the projecting of the substep (b1) is performed in an x-axis direction of orthogonal x-axis and y-axis directions of the display.

7. A method as claimed in claim 5 wherein the projecting of the substep (b1) is performed in a y-axis direction of orthogonal x-axis and y-axis directions of the display.

8. A method as claimed in claim 5 wherein the overlapped and overlapping objects are controls, and the boundary is defined by edges of a predetermined container object that contains the controls.

9. A method as claimed in claim 5 wherein the overlapped and overlapping objects are a scene and object contained within the scene.

10. A method as claimed in claim 5 wherein said step (e) includes successively dividing the changed portion of the display into smaller visible portions to generate the rect object.

11. A method as claimed in claim 10 wherein the rect object is determined by projecting an edge of the overlapped one of the first and second objects to an edge of the overlapping one of the first ant second objects to divide the overlapped object to form the rect object.

12. A method as claimed in claim 11 wherein the projecting is performed in an x-axis direction of orthogonal x-axis and y-axis directions of the display.

13. A method as claimed in claim 11 wherein the projecting of the substep (e1) is performed in a y-axis direction of orthogonal x-axis and y-axis directions of the display.

14. A method as claimed in claim 4 wherein the step (e) is performed by the computing device by its calling a GetRect method of a Rect Handler software module of the application program.

15. A method as claimed in claim 4 wherein after performance of the step (f) the computing device clears the rect object from its memory by calling a DeliverRect method of a Rect Handler software module of the application program that creates a pointer reference to the rect object so that a garbage collector module associated with the application program does not clear the rect object from the memory of the computing device.

16. A method as claimed in claim 4 wherein he a DeliverRect method stores the rect object in a data store of a Rect Handler software module for reuse in a subsequent update cycle.

17. A method as claimed in claim 16 wherein the application program defines at least one object in addition to the first and second objects, anti the step (e) is repeated successively for lowest to highest object of the display based on the hierarchy defined by the application program.

18. A method performed by a computing device, the method comprising the step of:
  a) dividing a visible portion of at least one of a plurality of overlapping objects that has changed from a previous to current update cycle into at least one rect object, using a graphical hierarchy defining precedence for display of the objects with the computing device,
    the step (a) being initiated by calling a GetRect method of a RectHandler module, and
    the calling of the GetRect method retrieving a rect object previously stored in the RectHandler module, the computing device setting at least one property of the rect object to define at least one of the position and size of the visible portion of the object to which the rect object pertains on a display generated by the computing device.

19. A method as claimed in claim 18 further comprising the steps of:
  b) determining whether the rect object is obstructed by an overlapping object at a higher level of the hierarchy; and
  c) if the rect object is obstructed by the overlapping object, dividing the rect object into at least one additional rect object.

20. A method as claimed in claim 18 further comprising the steps of:
  b) generating display data based on the rect object; and
  c) generating a display based on the display data.

* * * * *

UNITED STATES PATENT AND TRADEMARK OFFICE
CERTIFICATE OF CORRECTION

PATENT NO.    : 6,628,297 B1                                          Page 1 of 1
DATED         : September 30, 2003
INVENTOR(S)   : Wraae et al.

It is certified that error appears in the above-identified patent and that said Letters Patent is hereby corrected as shown below:

Title page, Item [54] and Column 1, line 1,
Title, cancel "APPARATUS," and ", AND ARTICLE".

Title page,
Item [56], References Cited, U.S. PATENT DOCUMENTS, insert the following:
-- 5,801,692    9/1998  Muzio et al. --.

Column 5,
Line 6, "FIGS. 4A-4C" should read -- FIGS. 4A-4G --.

Column 14,
Line 54, "steps" should read -- step --;
Line 59, "devices" should read -- device --.

Column 16,
Line 24, cancel "he";
Line 30, "anti" should read -- and --.

Signed and Sealed this

Sixth Day of April, 2004

JON W. DUDAS
*Acting Director of the United States Patent and Trademark Office*